METHOD OF MAKING A CHAIR BASE
Original Filed June 19, 1963
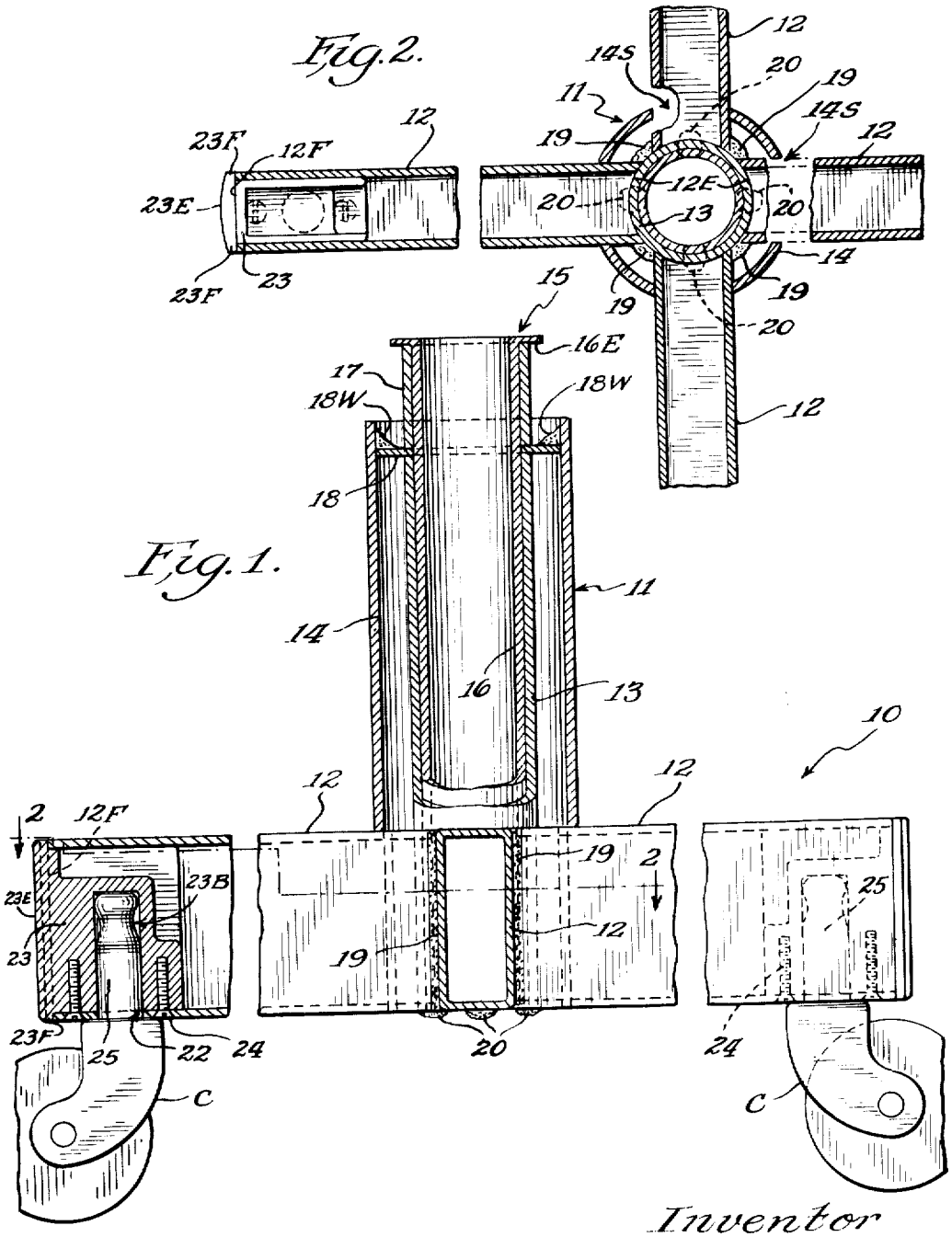
Inventor
Bruce O. Buhrmaster
By Mann, Brown + McWilliams
Attys United States Patent Office Re. 26,061
Reissued July 19, 1966

26,061

METHOD OF MAKING A CHAIR BASE

Bruce O. Buhrmaster, North Aurora, Ill., assignor to All-Steel Equipment Inc., a corporation of Illinois Original No. 3,186,064, dated June 1, 1965, Ser. No. 366,363, May 11, 1964, which is a division of Ser. No. 288,948, June 19, 1963. Application for reissue Oct. 20, 1965, Ser. No. 502,775

Matter enclosed in heavy brackets [ ] appears in the original patent but forms no part of this reissue specification; matter printed in italics indicates the additions made by reissue.

2 Claims. (Cl. 29—150)

This application is a division of parent application Ser. No. 288,948 filed June 19, 1953 *Now Patent No. 3,186,669 granted June 1, 1965.*

This invention relates to a chair base construction method, and more particularly is concerned with the method of making chair base structures of a type particularly suited for metal office chairs.

The principal object of the invention is to provide a method of fabricating a chair base construction that is durable and pleasing in appearance, while sharply reducing the manufacturing costs.

Another object of the invention is to provide a chair base construction method wherein the externally visible parts are pre-plated and interconnected by welding at junctures that are masked from external view by the pre-plated parts.

Other objects and advantages of this invention will be apparent during the course of the following description.

In the accompanying drawings forming a part of this specification, and in which like numerals are employed to designate like parts throughout the same;

FIG. 1 is a fragmentary side view of a chair base construction arranged in accordance with this invention and having a vertical center post structure shown in section and having mid-length portions of the legs broken out; and FIG. 2 is a sectional view taken on line 2—2 of FIG. 1.

Referring now to the drawings, the chair base arrangement illustrated for purposes of disclosure is designated generally at 10 and is particularly suited for metal office furniture. Accordingly, the chair base is comprised of a vertical center post structure designated generally at 11, and a set of four leg elements 12 fixed to and radiating from the center post structure and equipped with casters C to support the chair base in the usual fashion. In accordance with this invention, the center post structure includes a vertical inner shell 13, a vertical outer shell 14 supportingly engaged upon the inner shell at an upper region thereof and extending downwardly substantially coextensively therewith in outwardly spaced surroundings masking relation to the inner shell, and a hub assembly 15 comprising a hub sleeve 16 projecting vertically through the inner shell 13 to a location adjacent the lower end region thereof, and a hub support collar 17 encircling the upper end of the hub sleeve and engaging an end shoulder or flange 16E thereof to support the hub sleeve 16 from the shell structures.

In the preferred form illustrated herein for purposes of disclosure, the inner shell 13 is formed of 14 gauge circular steel tubing having an O.D. of 1⅜ inch, and the outer shell 14 is formed of .095 inch thickness of circular steel tubing having an O.D. of 2¼ inches and having peripherally spaced wall openings about its lower end to present a separate downwardly opening mounting slot 14S for receiving each support leg 12. The outer shell 14 is slightly longer than the inner shell 13 and receives a washer 18 secured by weld 18W in counter-sunk relation within its upper end to provide a support shoulder or annular ledge resting upon the upper end face of the inner shell 13.

Each of the support legs 12 is a hollow tubular form and is preferably formed of 14 gauge sheet steel stock to provide a vertically elongated generally rectangular profile in transverse section. Each leg 12 has its radially inner end portion projecting through a corresponding lower end slot 14S of the outer shell and terminating in an end face 12E of cylindrically concave profile and abutting a corresponding lower end side wall portion of the inner shell 13 such that lateral and upper extremities of such leg end face 12E define junctures with such shell side wall portions at locations that are masked by the outer shell 14 and such that lower extremities of such leg end face 12E are adjacent lower extremities of the inner shell 13 and of the hub sleeve 16 to define composite edge regions at locations that are also masked by the outer shell 14.

Weld lines 19 are provided along each of these junctures to secure the inner shell 13 and the legs 12 in rigid relation. Weld 20 is applied at each of these composite edge regions to secure the hub sleeve 16, the inner shell 13, and the legs 12.

It should be noted that the slots 14S defined by the wall openings at the lower end of the outer shell 14 are preferably of a profile matched to that of the legs to dispose the slots 14S in snug-fit socketing relation about the legs 12. This presents a trim appearance and ensures that all weld locations are masked from view when the chair is in normal use.

Each leg has its radially outer end opening endwise outwardly and also provided with a vertically downward wall opening 22 flanked by screw holes. Thus, each outer leg end presents a mounting socket of generally rectangular transverse profile, and an insert block 23, preferably of plastic, is nested in each such socket and has a generally corresponding transverse profile to seat snugly therein.

Each block 23 has end face structure 23E presenting an end cap closing off the mounting socket. Each block has a downwardly opening bore 23B flanked by screw holes for registry with the wall opening 22 and screw holes of the outer leg end. Preferably, the end face structure of each block 23 has a marginal edge flange 23F presenting a locating shoulder for external endwise abutment with the outer leg end face 12F to locate the bore 23B and screw holes in registry with the leg wall opening 22 and screw holes. Screws 24 secure the block 23 within the leg end, after which the support spindle 25 for each caster may be received within the bore of the block.

In accordance with the construction method of this invention, each of the legs 12 and the outer shell 14 are completely formed and then are pre-plated to provide a suitable external chrome coating thereon. Finishing these parts at this stage facilitates the plating operation to reduce the manufacturing costs materially. Pre-plating is made possible because all weld locations are effectively masked.

The fabrication and assembly of the chair base is carried out in the following fashion. Each of the pre-plated legs 12 is assembled in radially endwise directed abutment to a corresponding peripherally spaced side wall region at the lower end of the inner shell 13 to form line junctures therebetween. Weld 19 is applied along each juncture to lock these parts together; the pre-slotted and pre-plated outer shell 14 with washer 18 pre-welded at 18W is assembled onto the lower end of the completed hub assembly to provide a shell and hub subassembly which is then assembled onto the inner shell 13 to rest in supported relation thereon, with the outer shell 14 being located in surrounding relation to the inner shell and having its end slots 14S in socketing relation to the legs to mask the weld junctures, and with the hub sleeve 16 extending downwardly within the inner shell 13 and terminating adjacent lower extremities of the legs 12 and of the inner shell 13 to define composite edge regions at locations that are also masked by the outer shell; and finally, weld 20 is applied to these composite edge regions to secure the hub sleeve, the inner shell and the legs together.

While the preferred embodiment of the invention has been illustrated herein, it is to be understood that changes and variations may be made by those skilled in the art without departing from the spirit and scope of the appended claims.

What is claimed is:

1. The method of making a chair base for swivel chairs which consists in [preplating] *taking* an inner tubular shell, assembling and securing to said shell in radial directions, four, substantially rectilinear, preplated leg elements each having a substantially rectangular cross-sectional shape with the inner ends of said leg elements abutting said shell and with parallel vertical welds at juncture lines between the leg elements and the shell, mounting a preplated slotted outer shell over said inner shell and leg assembly in radially spaced relation to the inner shell with the slots of the outer shell opening downwardly and being shaped and spaced to receive the rectangular leg elements in close fitting relationship to thereby mask the welds, and then securing the outer shell to the inner shell and leg assembly in said radially spaced relation.

2. The method as set forth in claim 1 in which said last step consists in providing an [angular] *annular* ledge in the upper interior portion of the outer shell adapted to rest upon the upper end of said inner shell, telescopically mounting a hub sleeve within the inner shell and providing annular flange means on the upper exterior portion thereof adapted to bear against said ledge on the outer shell, and with the lower end of the hub sleeve extending approximately to the lower end of the inner sleeve, and welding the two last mentioned lower ends together to lock the outer sleeve to the inner shell and leg assembly.

References Cited by the Examiner

The following references, cited by the Examiner, are of record in the patented file of this patent or the original patent.

UNITED STATES PATENTS

| | | | |
|---|---|---|---|
| 782,932 | 2/1905 | Uhl | 248—415 |
| 1,052,799 | 2/1913 | Collingsworth | 108—83 |
| 1,182,889 | 5/1916 | Bolens | 248—188.1 |
| 2,218,583 | 10/1940 | Marthaler | 248—188.7 |
| 2,262,216 | 11/1941 | Vunovich | 248—158 |
| 2,470,397 | 5/1949 | Harter | 248—188.7 |
| 2,996,735 | 8/1961 | Knocke | 29—458 X |

FOREIGN PATENTS

| | | |
|---|---|---|
| 79,103 | 10/1951 | Norway. |

JOHN F. CAMPBELL, *Primary Examiner.*

THOMAS H. EAGER, *Examiner.*